United States Patent

Kelley

[11] 4,155,198
[45] May 22, 1979

[54] HANDLING SYSTEM FOR HORTICULTURAL MATERIALS

[76] Inventor: Albert W. Kelley, R.D. 1, Box 28, Creamridge, N.J. 08514

[21] Appl. No.: 854,832

[22] Filed: Nov. 25, 1977

Related U.S. Application Data

[63] Continuation-in-part of Ser. No. 741,470, Nov. 12, 1976, Pat. No. 4,065,877.

[51] Int. Cl.$^2$ .............................................. A01G 9/02
[52] U.S. Cl. ........................................ 47/84; 206/446; 206/561; 206/562; 229/16 A; 229/31 FS; 229/32; 229/34 R
[58] Field of Search ............... 47/84, 85, 32; 206/446, 206/482, 485, 487, 491, 493, 557, 558, 561, 562, 565, 601, 602, 620; 229/16 R, 16 A, 30, 31 R, 31 FS, 32, 34 R, 34 A

[56] References Cited

U.S. PATENT DOCUMENTS

| | | | |
|---|---|---|---|
| 1,567,165 | 12/1925 | Noland | 206/602 X |
| 2,293,187 | 8/1942 | Becker | 206/485 X |
| 2,349,020 | 5/1944 | Throckmorton | 206/446 X |
| 2,387,639 | 10/1945 | Bouchelle | 206/482 X |
| 2,688,431 | 9/1954 | Loeb et al. | 47/84 X |
| 2,725,141 | 11/1955 | Latvala et al. | 206/491 |
| 2,914,235 | 11/1959 | Jones | 206/491 X |
| 2,959,339 | 11/1960 | Sierk et al. | 206/446 X |
| 3,342,322 | 9/1967 | Weisner et al. | 206/446 |
| 3,507,441 | 4/1970 | Wilcox et al. | 206/602 X |
| 3,846,936 | 11/1974 | Kelley | 47/58 |

FOREIGN PATENT DOCUMENTS

| | | | |
|---|---|---|---|
| 597932 | 12/1925 | France | 206/487 |
| 1454746 | 11/1976 | United Kingdom | 206/620 |

*Primary Examiner*—E. H. Eickholt
*Attorney, Agent, or Firm*—Robert K. Youtie

[57] ABSTRACT

A handling system fabricated essentially of sheet material including a container defined by a tube of polygonal cross section having end tabs extending into overlapping relation with their overlapping portions secured together; a tray for a plurality of said containers including a lower support wall, upstanding flaps extending in end to end relation about the support wall and fastener means also fabricated of sheet material and securing together the ends of the flaps; a generally cylindrical tube adapted to rest endwise on the support wall with portions generally tangent to the flaps, and similar fastener means secured to the adjacent flap and cylinder portions; and the fastener means specifically including overlying sheet portions having cuts defining overlying strips displaceable away from the remainder of the sheet portions, an insert extendable through and beyond the space between displaced strips and adjacent sheet portions, and a tool for guiding the insert into position and removable from the insert to leave the latter in position.

22 Claims, 15 Drawing Figures

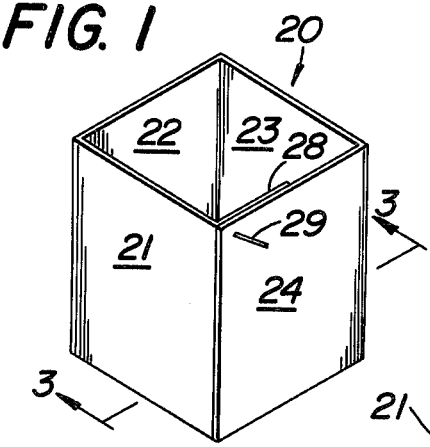
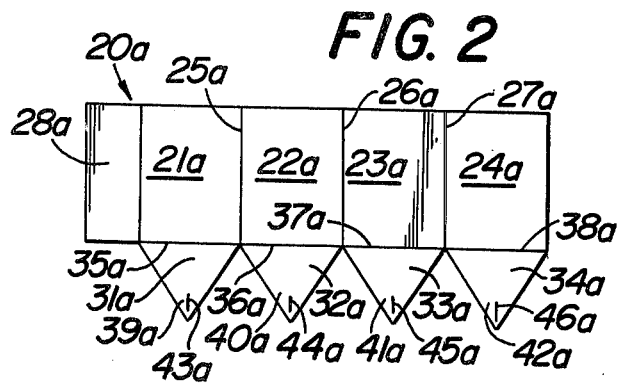
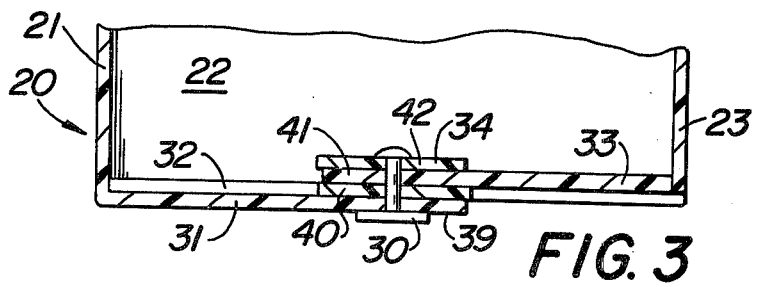
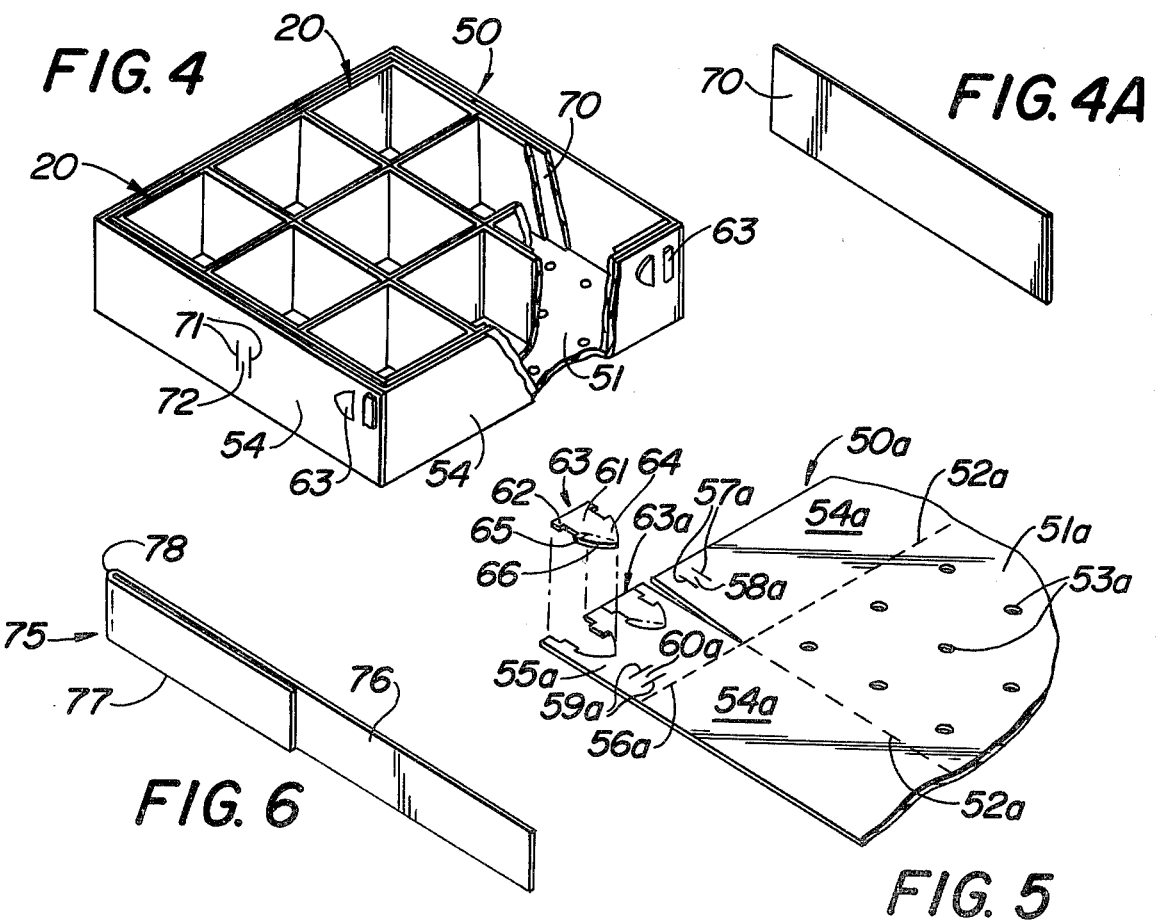

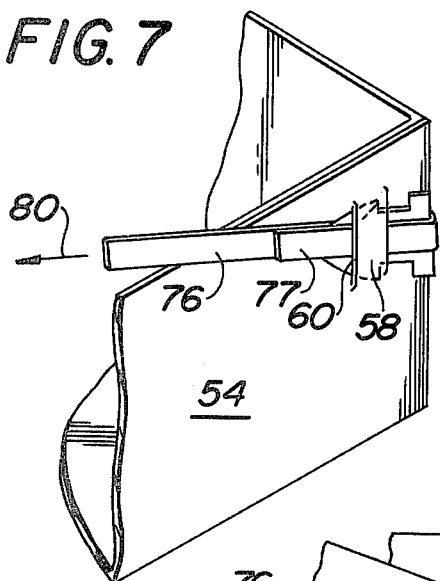
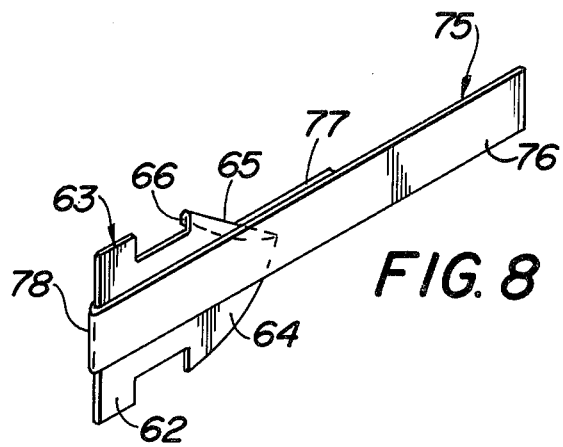
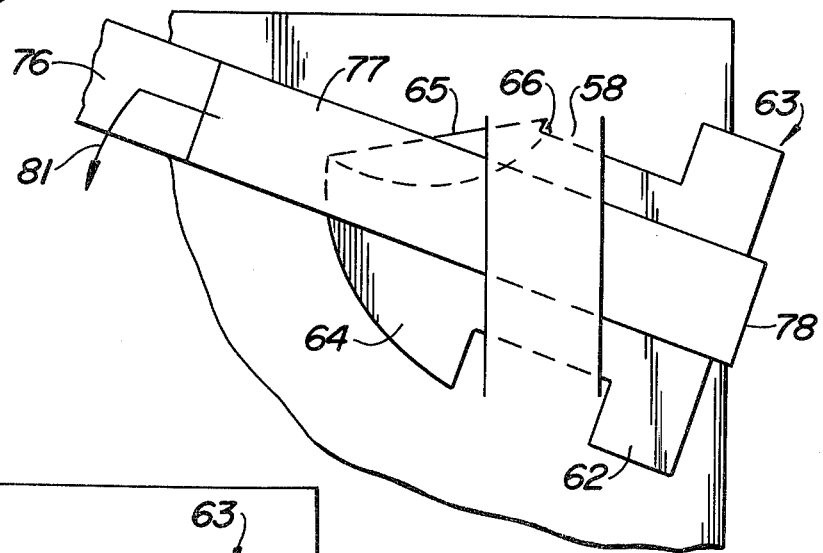
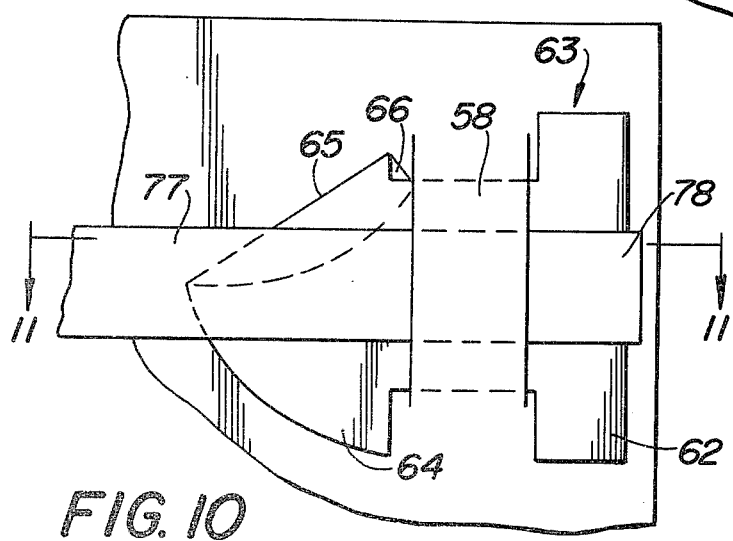

HANDLING SYSTEM FOR HORTICULTURAL MATERIALS

CROSS-REFERENCES TO RELATED APPLICATIONS

This application is a Continuation-In-Part of my copending patent application Ser. No. 741,470, filed Nov. 12, 1976 now U.S. Pat. No. 4,065,877.

BACKGROUND OF THE INVENTION

As is well known to those versed in plant husbandry, high labor costs in the necessarily repeated transplanting of growing plants, and high costs of materials and supplies required for such transplanting, have become serious economic problems, particularly to the commercial grower. While my prior U.S. Pat. No. 3,846,936 has disclosed certain improvements toward reducing labor and material costs, there remains the need for additional reduction in such costs.

SUMMARY OF THE INVENTION

Accordingly, it is an important object of the present invention to provide a highly improved handling system of containers for horticultural materials, such as soil in plant husbandry, particularly in the necessarily repeated transplanting of growing plants, which system effectively simplifies and greatly reduces labor in the early plant growing stage, including germination or rooting from seeds, and later transplanting to successively larger containers and compartments as required for growth.

It is another object of the present invention to provide a plant husbandry handling system of containers having the advantageous characteristics mentioned in the preceding paragraph, wherein the components are highly interchangeable for use in different growing stages, extremely economical to manufacture of standard sheet stock, being well adapted for mass production die scoring and cutting, and wherein the several components of the system are admirably well-suited for long continued re-use to achieve additional economies.

It is still a further object of the present invention to provide a plant husbandry system of containers for handling horticultural materials, which may be economically stored and shipped in a collapsed, knocked down or flat condition to occupy a minimum of space, while being adapted for quick and easy set-up or erection, when desired.

The invention further contemplates the provision of an improved fastener assembly for use with sheet materials, which is extremely economic to produce, simple to operate, secure and long lasting, while being unobtrusive so as not to detract from aesthetic design.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top perspective view showing a receptacle or container of the materials handling system of the present invention.

FIG. 2 is a plan view showing a blank from which the receptacle of FIG. 1 may be formed.

FIG. 3 is a partial sectional elevational view, taken generally along the line 3—3 of FIG. 1, enlarged for clarity.

FIG. 4 is a top perspective view showing an assemblage of containers of FIG. 1, together with a tray or larger receptacle receiving the containers, and including wall reinforcement members for the larger container.

FIG. 4a is a perspective view showing a reinforcement member apart from the assembly of FIG. 4.

FIG. 5 is a partial perspective view showing a blank from which the tray of FIG. 4 may be formed, and illustrating an insert part or fastener element removed therefrom.

FIG. 6 is a perspective view showing a tool for use in erecting certain components of the instant invention.

FIG. 7 shows a partial perspective view illustrating erection of the tray of FIG. 4 and securement of the wall fastener means.

FIG. 8 is a perspective view showing a fastener element and tool, as employed in the step of FIG. 7, but illustrating the reverse side of the tool.

FIG. 9 is an enlarged elevational view similar to FIG. 7, but showing a slightly later stage in the securing procedure.

FIG. 10 is a view similar to FIG. 9, but showing still another slightly later stage in the securing procedure.

DESCRIPTION OF THE PREFERRED EMBODIMENT

Figure 11:
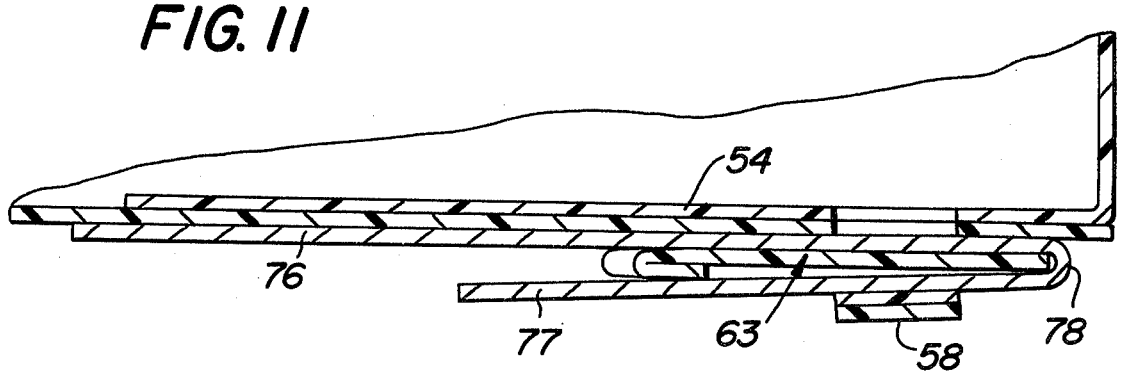
FIG. 11 is a sectional view taken generally along the line 11—11 of FIG. 10.

Referring now more particularly to the drawings, and specifically to FIGS. 1-3 thereof, a container or receptacle is there generally designated 20, and may be fabricated from the integral, one piece blank 20a of FIG. 2. The blank may be formed of stiff, but flexible and foldable sheet material, such as polyethylene plastic, or other suitable material of a desired gauge or thickness, selected for both strength and economy. The blank 20a may include a plurality of generally rectangular panels 21a, 22a, 23a and 24a, which may all be substantially congruent and arranged in aligned, side by side contiguous relation. More particularly, the adjacent pair of panels 21a and 22a have their adjacent sides hingedly connected together by a foldline 25a, with their respective adjacent end edges in alignment. Similarly, the adjacent pair of panels 22a and 23a are hingedly connected together by a longitudinally coextensive foldline or hinge 26a, as are the longitudinally coextensive, adjacent pair of panels 23a and 24a connected together by a crease or fold 27a. Extending from the outerside edge of one outermost panel, say panel 21a, may be a securement flap 28a, generally longitudinally coextensive with and hingedly connected to the adjacent panel.

In addition, extending from one end of each panel 21a, 22a, 23a and 24a, say the lower ends thereof as seen in the drawing, may be a plurality of swingable tabs or extensions 31a, 32a, 33a and 34a. Thus, the tab 31a is hingedly connected along and coextensive with the lower end edge of panel 21a by a crease or foldline 35a. Similarly, the tabs or extensions 32a, 33a and 34a are coextensive with and hingedly connected to the lower edges of panels 22a, 23a and 24a by foldlines or creases 36a, 37a and 38a. An advantageous configuration for the several tabs 31a, 32a, 33a and 34a is that of an isosceles triangle, such that the apices of the several tabs define overlapping end portions in the set up container, as will appear presently, and to permit of maximum utilization of material with minimum waste.

Each of the tabs 31a, 32a, 33a and 34a may be provided at its distal or free end portion 39a, 40a, 41a and 42a, respectively, with a through opening, or aperture, such as the cuts 43a, 44a, 45a and 46a.

In order to erect the container 20, the blank 20a is folded along its several foldlines 25a, 26a and 27a to swing the panels 21a, 22a, 23a and 24a into a closed tubular formation of generally polygonal cross section, with the flap 28a in facing engagement with the opposite endmost panel 24a. In this condition, the several panels define side walls 21, 22, 23 and 24, the flap 28 serving to secure the tubular formation closed, as by a staple 29, or other fastener extending through the flap and adjacent wall 24.

In addition, the several tabs or extensions 31a, 32a, 33a and 34a are swung inwardly of the tube, generally normal to their respective adjacent tube walls to define bottom wall parts 31, 32, 33 and 34, as seen in FIG. 3, with overlapping end portions 39, 40, 41 and 42. A suitable fastener, as at 30, may extend through the several slits or openings in the overlapping end portions 39-42, to secure the same together, so that the tabs 31-34 combine to define a bottom wall. While the fastener 30 is illustrated as a rivet, it may be merely a wood screw, paper fastener or other suitable fastener element.

Thus, the container or receptacle 20 has an open top and is adapted to contain suitable growing medium or soil for a growing plant. It will also be observed that the bottom wall 31-34, combined of the several overlapping tabs, affords drainage openings between the tabs, as required for growing plants. Of course, the container 20 may be of any suitable size, as desired, the material of blank 20a being selected accordingly.

In FIG. 4 there are shown a plurality of containers 20 arranged in adjacent relation and conformably within an outer receptacle or tray generally designated 50.

The tray 50 may also be fabricated essentially of a single integral blank of suitably stiff, foldable sheet material, such as polyethylene. For example, the blank 50a, partially shown in FIG. 5, may be formed into the tray 50, and may include a generally rectangular central panel 51a, bounded by foldlines or creases 52a. The central panel 51a may be provided with a plurality of through openings, holes or other suitable drainage outlets, as at 53a.

Extending from each bounding edge foldline or crease 52a, and coextensive therewith is an integral side wall panel or flap 54a. The side wall panels or flaps 54a may each be generally rectangular, and provided on one end with an integral extension 55a, hingedly connected to the adjacent flap end, as by foldline or crease 56a. Adjacent to the other end of each flap 52a remote from the extension 55a, there are formed a pair of generally parallel slits or cuts 57a, combining to define of the material therebetween a strip 58a of sufficient flexibility for convenient displacement out of the plane of the adjacent material of flap 54a. A similar pair of parallel cuts or slits 59a are formed in the extension 55a, combining to define of the material between the cuts a flexibly displaceable strip 60a.

Also formed of the material of each extension 55a, and separable therefrom, are one or more insert parts 63 which includes a midregion 61 of a length approximately equal to the width of each strip 58a, 60a. Also, the lateral extent of midregion 61 of insert part 63 approximates the length of each strip 58a, 60a. One end region, as at 62, of the insert part 63 is enlarged and may be of generally rectangular configuration, having a lateral dimension greater than that of the midregion 61. The other end region 64 of the insert part 63 is also laterally enlarged, but advantageously of an outwardly tapering or wedge-shaped configuration. Further, the enlarged end portion 64 may be provided with a foldline, score or crease 65, extending generally longitudinally and oblique, so as to form of the laterally outward region 66 a flap foldable inwardly to effectively reduce the overall lateral dimension of the end portion 64, all for a purpose appearing presently.

As is apparent, numeral designation of the parts of a blank include the suffix "a", while corresponding parts of the component erected from the blank are designated by corresponding numerals without the suffix. Thus, it will be seen that the insert part remaining in the flap extension 55a as designated 63a.

In order to set-up or erect the tray 50 from the blank 50a, the several side flaps 54 a are swung upwardly about their hinged connections 52a, generally normal to the central panel 51a. In this condition, the extensions 55a are swung about their hinged connections 56a interiorly of and in overlapping relation with the end portion of the adjacent flap 54a. Further, the cuts 59a overlie the cuts 57a, respectively, and the strip 60a overlies the strip 58a. The overlying strips 58a and 60a may then together be displaced outwardly, beyond the plane of the adjacent flap 54a. In this condition, an insert part 63 may be inserted through the aligned pairs of slots 57 and 59, between the outwardly displaced strips 58 and 60, and the outer surface of each flap 54a. This fully set-up condition is shown in FIG. 4, wherein the several side walls flaps 54, having their ends secured together in the manner described, combine to define a surrounding wall circumscribed about the plurality of containers 20.

When the several containers 20 are filled with growing medium or soil, it has been found that the tray 50 may be fabricated of lighter gauge or thinner sheet material, and maintain the containers without bowing of the surrounding wall 54, by reinforcing the latter. More particularly, a plurality of generally rectangular reinforcing members or panels 70, each congruent to a respective surrounding wall panel 54, may be interposed between the latter and the adjacent containers 20, as seen in FIG. 4.

It will also be observed in FIG. 4, that the several surrounding wall panels 54 may each be provided, intermediate its ends, with an additional pair of generally parallel, spaced cuts or slits 71, combining to define of the wall material therebetween a flexible strip 72 displaceable out of the plane of the side wall. This serves a purpose which will be described hereinafter in greater detail.

An advantageous procedure for quickly and easily inserting several of the insert parts 63 into their securing positions involves the use of a relatively simple tool, shown in FIG. 6 and there generally designated 75. The tool may be fabricated of a single length of resilient spring strip material, such as steel, or other suitably stiff resilient material, and includes an elongate handle, stem or shank region 76. On one end of the stem or handle region 76 there is provided a substantially closed, generally U-shaped spring holder or clip 77. That is, the U-shaped spring clip 77 has its closed or bite region 78 remote from the handle or stem 76. In practice, the insertion tool 75 may be fabricated from a single length of spring strip material bent approximately 180° about an axis generally normal to the longitudinal dimension to form the clip.

In FIG. 8 is shown the tool 75 carrying in its clip 77 an insert part 63. In particular, the insert part 63 is arranged with its rectangular or blunt end enlargement 62 against the closed end or bend 78 of the clip, with the outwardly tapering end enlargement 64 extending toward the tool handle or stem 67. Also, the tapered insert part end enlargement 64 is folded along its foldline 65, to swing the laterally outer portion 66 into position overlying the adjacent portion of enlargement 64, so as to effectively reduce the lateral extent of the enlargement 64.

In this condition, the tool 75 carrying insert part 63, is inserted in the space between an outwardly displaced overlying pair of strips 58 and 60, and the adjacent portion of side wall flap 54 (see FIG. 7) with the tool stem 76 leading, in the direction of arrow 80.

By the reduced lateral extent of tapered end enlargement 64, as described hereinbefore, the enlargement will be enabled to pass through and beyond the pair of displaced strip portions 58 and 60. This may be facilitated by a zig-zag or angular tool movement. For example, the unfolded or laterally extending side of the enlargement 64 may first be passed beyond the strips 58 and 60, as in FIG. 9, and the tool then swung in the direction of arrow 81 to pass the entire end enlargement 64 beyond the strips 58 and 60, the position shown in FIG. 10.

Figure 12:
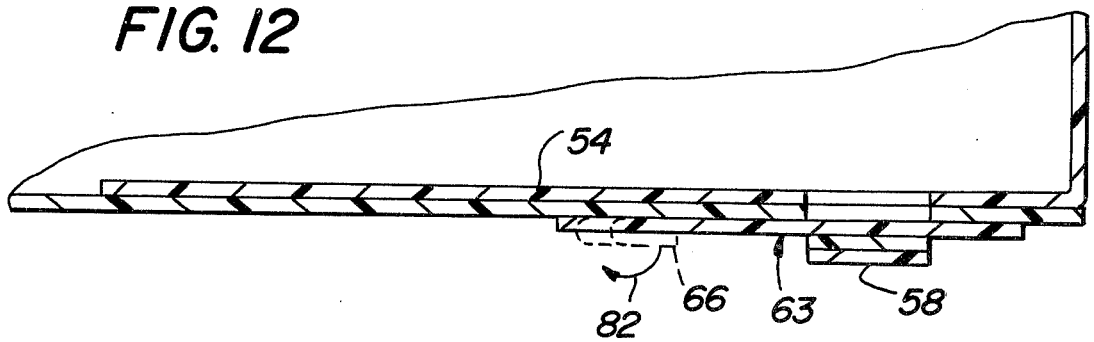
FIG. 12 is a view similar to FIG. 11, but after removal of the insertion tool.

In this condition, the end enlargements 62 and 64 are on opposite sides of the overlying strips 58, 60, and the tool 75 may be removed, as by withdrawal rightward from the position shown in FIGS. 10 and 11, to leave the insert part 63 in position. The folded portion 66 may then be unfolded, to laterally re-extend the end enlargement 64, so that both end enlargements 62 and 64 now extend beyond opposite ends of the strips 58 and 60, so as to be self-retaining in the securing position. The unfolding of the insert part portion 66 is shown in FIG. 12, in the direction of arrow 82.

Figure 13:
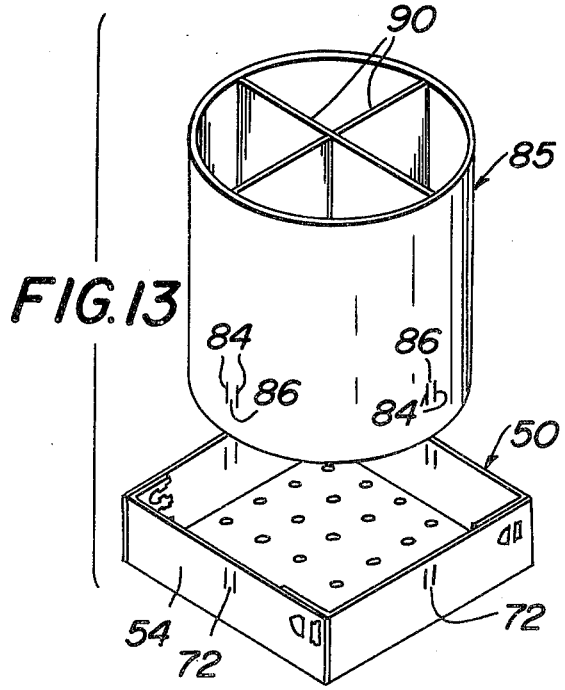
FIG. 13 is an exploded perspective view showing another assemblage of components of the instant invention.
Figure 14:
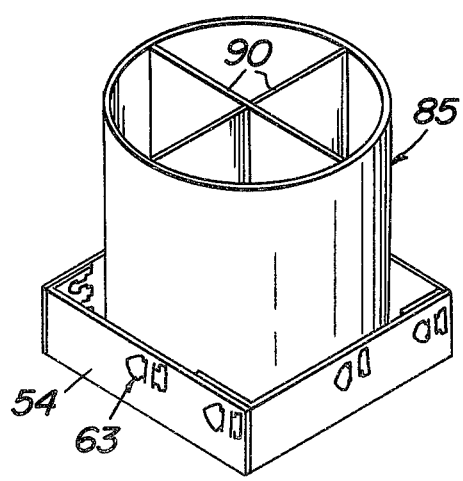
FIG. 14 is a perspective view showing the components of FIG. 13 in an operative secured condition.

In addition to the containers 20, which may be used independently or together with each other and the tray 50, there may be provided an open ended tube or cylinder, as in FIGS. 13 and 14, generally designated 85. The cylinder 85 is of a diameter so as to seat endwise on the upper surface of lower or support wall 51 of tray 50, with several portions of the cylinder generally tangential to midregions of the tray side walls 54. These tangential portions of the cylinder or tube 85 may each be provided with a pair of generally parallel spaced slits or cuts 84 combining to define in the space therebetween a flexible strip 86. Each strip 86 may be located in conformably overlying relation with a respective strip 72 of the adjacent tray side wall flap 54. Further, the overlying strips 72 and 86 may be displaced together outwardly beyond the wall of the adjacent side wall flap 54, and an insert part 63 engaged in the space therebetween, see FIG. 14.

To facilitate the hereinbefore described securement procedure, it is understood that suitable supports, jigs or the like may be employed to hold one or both of the members being secured. For example, it is contemplated that a cylinder 85 may be distended in horizontal condition, say over a triangular arrangement of horizontal pins, in which condition a tray 50 may be readily positioned to receive one end of the cylinder and the securing proceed as described.

Illustrated interiorly of the tube or cylinder 85 are a pair of crossed dividers 90, subdividing the interior of the cylinder into quadrants. By this means, the tube 85 may serve to provide growing space for plants requiring a single quadrant, a half of the cylinder, or the entire cylinder, as desired.

From the foregoing, it will now be seen that the present invention provides unique improvements in plant husbandry handling systems, wherein both the commercial grower and amateur gardener may advantageously utilize the economies of mass produced, erect it yourself receptacles, with ease, facility and enjoyment.

Although the present invention has been described in some detail by way of illustration and example for purposes of clarity of understanding, it is understood that certain changes and modifications may be made within the spirit of the invention.

What is claimed is:

1. In a handling system, a tray comprising a generally polygonal lower support wall having drain openings and configured to conformably support a predetermined number of containers, and an upstanding surrounding wall extending circumferentially about said support wall for conformably surrounding said predetermined number of containers, said surrounding wall comprising a flap upstanding integrally from each side edge of said support wall, securing means securing together adjacent end portions of said flaps, and partial securing means on each flap intermediate the ends thereof for tangential securement to an upstanding cylinder on said support wall generally tangent to said flaps.

2. A handling system according to claim 1, said tray support and surrounding walls being integrally fabricated of a stiff foldable plastic tray sheet.

3. A handling system according to claim 2, said tray sheet comprising a central polygonal panel defining said support wall, a plurality of flaps extending integrally from respective sides of said central panel and hingedly connected to the latter by folds, said flaps being swingable upwardly relative to said central panel into end to end relation with each other to define said surrounding wall, and securing means securing said flaps in said end to end relation.

4. A handling system according to claim 1, in combination with an open ended cylinder removably upstanding on said support wall in tangential relation with each of said flaps, and a pair of cuts in said cylinder defining therebetween a cylinder strip and located adjacent to each of said flaps, said partial securing means comprising a pair of flap cuts in each flap defining therebetween a flap strip adjacent to a respective cylinder strip, each of said flap strips overlying the adjacent cylinder strip and being displaceable with the latter outwardly away from the plane of the respective adjacent flap, and an insert part having end enlargements insertable into the space between each flap and said displaced strips with said end enlargements on opposite sides of the adjacent strip to retain the insert part in position.

5. A handling system according to claim 4, an insert part being fabricated of the same material as said flaps.

6. In a handling system, a container comprising a plurality of substantially equal length panels in side by side aligned relation with their adjacent side edges connected together and their end edges generally coplanar, said panels being swingable into a closed polygonal configuration to define a tube, a flap hingedly connected to the outer side edge of one outer panel and swingable into overlapping engagement with the other outer panel, a fastener extending through overlapping regions of said flap and other outer panel, a plurality of substantially identical tabs each hinged on one end edge of each panel at one end of said tube, said tabs tapering toward their free ends and being swingable generally normal to said panels with their free end portions overlying each other generally centrally of said tube to substantially close one tube end, and a fastener securing together said overlying free tab end portions, the remaining tab portions being free of each other, whereby said tube provides a soil container side wall and said tabs provide a soil container bottom wall with soil drainage between tabs.

7. A handling system according to claim 6, said panels, flap and tabs all being integrally fabricated of a stiff foldable plastic container sheet.

8. A handling system according to claim 7, said container sheet having folds defining hinged connections between adjacent panels and their respective tabs and flap.

9. A handling system according to claim 6, in combination with a tray for conformably receiving a plurality of said containers and comprising a lower support wall specifically configured for supporting engagement with the undersides of a predetermined number of said containers, said support wall being open for draining, and an upstanding surrounding wall extending circumferentially about said support wall in surrounding relation with said containers and upstanding from said support wall to a height no greater than that of said containers.

10. A handling system according to claim 9, said tray support and surrounding walls being integrally fabricated of a stiff foldable plastic tray sheet.

11. A handling system according to claim 10, said tray sheet comprising a central polygonal panel defining a support wall, a plurality of flaps extending integrally from respective sides of said central panel and hingedly connected to the latter by folds, said flaps being swingable upwardly relative to said central panel into end to end relation with each other to define said surrounding wall, and securing means releasably securing said flaps in said end to end relation.

12. A handling system according to claim 11, in combination with a stiffener board fabricated of less flexible material relative to that of said tubes and tray and removably engageable between each of said flaps and the adjacent containers to resist flap bowing.

13. In a handling system, a container comprising a plurality of substantially equal length panels in side by side aligned relation with their adjacent side edges connected together and their end edges generally coplanar, said panels being swingable into a closed polygonal configuration to define a tube, a tab hinged on one end edge of each panel at one end of said tube, said tabs being swingable generally normal to said panels with their free end portions overlying each other generally centrally of said tube, a fastener securing together said overlying free tab end portions, said tube providing a soil container side wall and said tabs providing a soil container bottom wall with drainage for the soil, and a tray for conformably receiving a plurality of said containers and comprising a lower support wall specifically configured for supporting engagement with the undersides of a predetermined number of said containers, said support wall being open for draining, and an upstanding surrounding wall extending circumferentially about said support wall in surrounding relation with said containers on said support wall, said tray support and surrounding walls being integrally fabricated of a stiff foldable plastic tray sheet, said tray sheet comprising a central polygonal panel defining a support wall, a plurality of flaps extending integrally from respective sides of said central panel and hingedly connected to the latter by folds, said flaps being swingable upwardly relative to said central panel into end to end relation with each other to define said surrounding wall, and securing means releasably securing said flaps in said end to end relation, said securing means comprising a pair of overlapping sheet portions, said sheet portions each having a pair of cuts defining therebetween a strip with the strips of said sheet portions in overlying relation, said strips being displaceable out of the planes of said overlying sheet portions, and an insert part having end enlargements and insertable into the space between said sheet portions and displaced strips with said end enlargements on opposite sides of said strips to retain the insert part in position.

14. A handling system according to claim 13, said insert part being fabricated of the same material as said sheet portions.

15. A handling system according to claim 13, said end enlargements having a lateral dimension greater than the length of said strips for retention thereby, and a score on one end enlargement for folding the latter to facilitate insertion into said space.

16. A handling system according to claim 13, in combination with a tool comprising an elongate stem configured to pass through said cuts, and a clip on one end of said stem having its outer end closed for carrying said insert part into said space, said clip and stem being withdrawable without said insert part to leave the latter in position in said space.

17. In a handling system, a tray comprising a generally polygonal lower support wall having drain openings and configured to conformably support a predetermined number of containers, and an upstanding surrounding wall extending circumferentially about said support wall for conformably surrounding said predetermined number of containers, said surrounding wall comprising a flap upstanding integrally from each side edge of said support wall, securing means securing together adjacent end portions of said flaps, and partial securing means on each flap intermediate the ends thereof for securement to an upstanding cylinder on said support wall generally tangent to said flaps, said tray support and surrounding walls being integrally fabricated of a stiff foldable plastic tray sheet, said tray sheet comprising a central polygonal panel defining said support wall, a plurality of flaps extending integrally from respective sides of said central panel and hingedly connected to the latter by folds, said flaps being swingable upwardly relative to said central panel into end to end relation with each other to define said surrounding wall, and securing means securing said flaps in said end to end relation, said securing means comprising a pair of overlapping sheet portions, said sheet portions each having a pair of cuts defining therebetween a strip with the strips of said sheet portions in overlying relation, said strips being displaceable out of the plane of said overlying sheet portions, and an insert part having end enlargements and insertable into the space between said sheet portions and displaced strips with said end enlargements on opposite sides of said strips to retain the insert part in securing position.

18. A handling system according to claim 17, in combination with a tool comprising an elongate stem configured to pass through said cuts, and a clip on one end of said stem having its outer end closed for carrying said insert part into said space, said clip and stem being withdrawable without said insert part to leave the latter in securing position.

19. Fastener means for flexible sheet material comprising a pair of overlying sheet portions, said sheet portions each having a pair of cuts defining therebetween a strip with the strips of said sheet portions in overlying relation, said strips being displaceable out of the plane of said overlying sheet portions, and an insert part having end enlargements and insertable into the space between said sheet portions and displaced strips with said end enlargements on opposite sides of said strip to retain the insert part in secured position.

20. Fastener means according to claim 19, said insert part being fabricated out of the same material as said sheet portions.

21. Fastener means according to claim 19, said end enlargements having a lateral dimension greater than the length of said strips for retention thereby, and a score on one end enlargement for folding the latter to facilitate insertion into said space.

22. Fastener means according to claim 19, in combination with a tool comprising an elongate stem configured to pass through said cuts, and a clip on one end of said stem having its outer end closed for carrying said insert part into said space, said clip and stem being withdrawable without said insert part to leave the latter in position.

* * * * *